UNITED STATES PATENT OFFICE.

WILLIAM G. ADAMS, OF BOSTON, MASSACHUSETTS.

IMPROVEMENT IN HULLING RICE, &c.

Specification forming part of Letters Patent No. 57,838, dated September 11, 1866.

*To all whom it may concern:*

Be it known that I, WILLIAM G. ADAMS, of Boston, in the county of Suffolk and State of Massachusetts, have invented an Improvement in Hulling or Husking Rice and other seeds; and I do hereby declare that the following is a description of my invention, sufficient to enable those skilled in the art to practice it.

The invention relates to the manner of removing the husks or vegetable coverings from rice and other grain or seeds, or in preparing the same for the action of mechanism to facilitate such removal by abrasion.

The invention consists in subjecting the seeds or grain to the action of steam in a steam cylinder or chest, and in discharging the same from the cylinder or chest under pressure of the steam, the hulls or coverings being wholly or partially removed by the expansion of the steam.

In the practice of my invention I prefer to use superheated steam; and in blowing the grain or seeds from the cylinder, after being subjected to the action of the steam, the impetus given to the kernels or seeds strips them from the husks, hulls, or seed-covers, or so far softens the gluten that forms the union between them as to enable the seeds to be readily cleaned from their husks by abrasion.

The invention is particularly applicable to the removal of the "wool" or cotton from cotton-seed, the steam softening the adhesive matter, and the discharge from the cylinder driving the seed clear from the cotton.

In hulling or husking rice by this process the action and expansion of the steam loosens the coating from the grain, and by then passing the rice between rolls, or between a roll and band moving in contact, one at greater speed than the other, in such manner as to strip the softened and loosened husk from the grain by friction of the surfaces, one of which is preferably elastic, the husks and grain are readily and effectually separated.

I claim—

The process of treating grain, seeds, &c., with reference to the removal of the husks or coverings therefrom, substantially as set forth.

WM. G. ADAMS.

Witnesses:
    J. B. CROSBY,
    F. GOULD.